(No Model.)

H. LOESNER & M. DE BRAVURA.
CONDUIT FOR UNDERGROUND CONDUCTORS.

No. 360,316. Patented Mar. 29, 1887.

WITNESSES:
Chas. Nida
C. Sedgwick

INVENTOR:
M. de Bravura
H. Loesner
BY Munn & Co
ATTORNEYS.

United States Patent Office.

HANS LOESNER AND MICHEL DE BRAVURA, OF NEW YORK, N. Y.

CONDUIT FOR UNDERGROUND CONDUCTORS.

SPECIFICATION forming part of Letters Patent No. 360,316, dated March 29, 1887.

Application filed December 31, 1886. Serial No. 223,149. (No model.)

*To all whom it may concern:*

Be it known that we, HANS LOESNER and MICHEL DE BRAVURA, of the city, county, and State of New York, have invented a new and Improved Conduit for Underground Conductors, of which the following is a full, clear, and exact description.

This invention relates to a novel form of conduit for underground conductors, the objects of the invention being to provide for the perfect insulation and protection of the said conductors.

To the end named our invention consists of glass plates formed with registering recesses, which, when the plates are put together, form grooves or conduits, within which the wires or conductors are to be placed, the plates being formed upon one side with projections and upon the other with correspondingly-shaped recesses, so that when the plates are applied to form the conduit the projections of one plate will enter the correspondingly-formed recesses of the other, and the plates will be held against lateral displacement.

Reference is to be had to the accompanying drawings, forming a part of this specification, in which similar figures of reference indicate corresponding parts in all the views.

Figure 1:
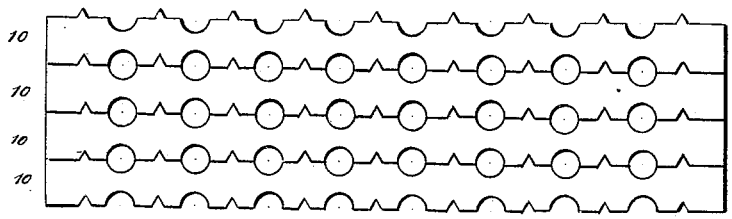
Figure 2:
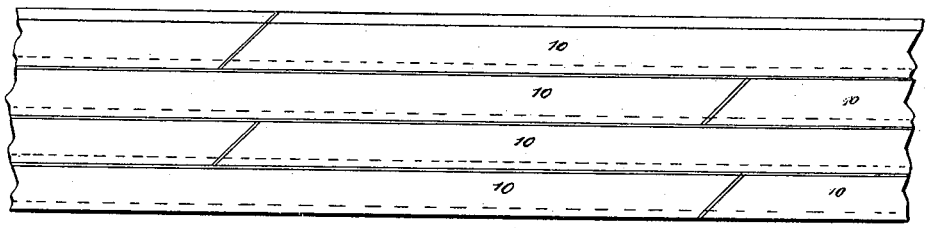
Figure 3:
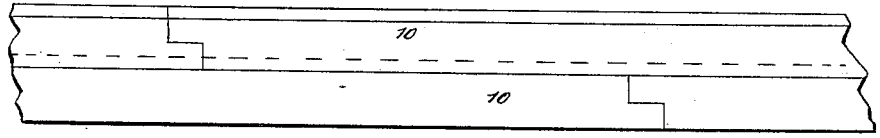
Figure 4:
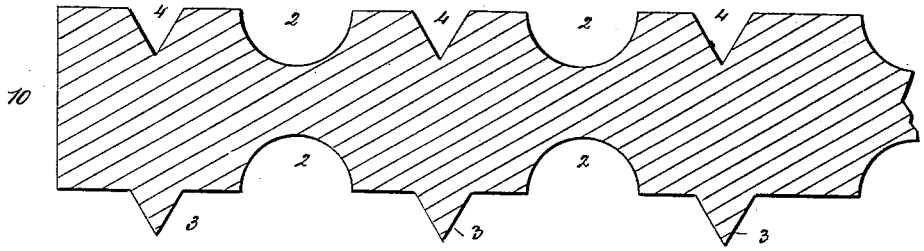

Figure 1 is an end view of a conduit constructed in accordance with the terms of our invention. Fig. 2 is a side view of a portion of the conduit. Fig. 3 is a view of a modified form of plate, and Fig. 4 is a cross-sectional view of a portion of a full-sized plate.

In constructing such a conduit as the one forming the subject-matter of this application, we provide a series of plates, 10, that are formed with longitudinal recesses 2, the recesses formed in the upper face of one plate being arranged to register with the recesses formed in the lower face of the other plate; and each of the plates 10 is also formed with a series of longitudinal ribs or projections, 3, upon one side and a series of correspondingly-shaped longitudinal grooves, 4, upon the other side, the arrangement being such that when one plate is applied to the other the ribs 3 will enter the grooves or recesses 4, and the plates will be held against relative lateral movement.

The ends of the plates are parallel and inclined, as shown in Fig. 2, or they might be of the form indicated in Fig. 3; and in building a conduit the plates of one layer or series are arranged so that they will break joint with the plates of the other layers or series of plates, a proper binding material or cement being interposed between each set or series of plates, which binding material will not only hold the plates together, but will insure a perfect insulation of the wires. In building very large conduits the plates might be laid within tunnels formed for their reception.

From the construction described it will be seen that by varying the size of the recesses 2 the plates may be arranged to receive single-wire conductors or couples of such size as may be required. By forming and uniting the plates as above described we insulate the wires from the earth and from each other and protect them against the action of moisture or water.

Having thus fully described our invention, we claim as new and desire to secure by Letters Patent—

1. A conduit for underground conductors, consisting of a series of plates, each provided with longitudinal recesses 2 on opposite sides and with the longitudinal recesses 4 on one side and the longitudinal ribs 3 on the other side, the said recesses 4 and ribs 3 being between the recesses 2, substantially as described, whereby provision is made for preventing lateral movement of the said plates, substantially as herein shown and described.

2. A conduit for underground conductors, consisting of a series of superposed glass plates arranged to break joints, each plate provided with the recesses 2 on opposite sides and with the recess 4 on one side and the ribs 3 on the other, the said recess 4 and ribs 3 being between the recesses 2, substantially as herein shown and described.

HANS LOESNER.
MICHEL DE BRAVURA.

Witnesses:
EDWARD KENT, Jr.,
C. SEDGWICK.